(12) United States Patent
Wang et al.

(10) Patent No.: US 12,242,563 B2
(45) Date of Patent: Mar. 4, 2025

(54) METHOD AND SYSTEM FOR PREDICTING OPERATION TIME OF SPARSE MATRIX VECTOR MULTIPLICATION

(71) Applicants: CHINA INSTITUTE OF ATOMIC ENERGY, Beijing (CN); COMPUTER NETWORK INFORMATION CENTER, CHINESE ACADEMY OF SCIENCES, Beijing (CN)

(72) Inventors: Jue Wang, Beijing (CN); Yangde Feng, Beijing (CN); Yangang Wang, Beijing (CN); Zhongxiao Cao, Beijing (CN); Wen Yang, Beijing (CN); Tiancai Liu, Beijing (CN); Ningming Nie, Beijing (CN); Fuhai Gao, Beijing (CN); Xiaoguang Wang, Beijing (CN); Yue Gao, Beijing (CN)

(73) Assignees: CHINA INSTITUTE OF ATOMIC ENERGY, Beijing (CN); COMPUTER NETWORK INFORMATION CENTER, CHINESE ACADEMY OF SCIENCES, Beijing (CN)

( * ) Notice: Subject to any disclaimer, the term of this patent is extended or adjusted under 35 U.S.C. 154(b) by 867 days.

(21) Appl. No.: 17/432,685

(22) PCT Filed: Nov. 16, 2020

(86) PCT No.: PCT/CN2020/129085
§ 371 (c)(1),
(2) Date: Aug. 20, 2021

(87) PCT Pub. No.: WO2022/021673
PCT Pub. Date: Feb. 3, 2022

(65) Prior Publication Data
US 2022/0164413 A1    May 26, 2022

(30) Foreign Application Priority Data

Jul. 31, 2020   (CN) .......................... 202010759916.0

(51) Int. Cl.
*G06F 17/16* (2006.01)
*G06N 3/08* (2023.01)
(52) U.S. Cl.
CPC ............... *G06F 17/16* (2013.01); *G06N 3/08* (2013.01)
(58) Field of Classification Search
CPC .......... G06F 17/16; G06F 7/523; G06N 3/08; G06N 3/045; Y04S 10/50
See application file for complete search history.

(56) References Cited

U.S. PATENT DOCUMENTS 9,697,176 B2 * 7/2017 Daga ....................... G06F 17/16
2002/0022956 A1 * 2/2002 Ukrainczyk ............ G06F 40/20
707/E17.084

(Continued)

FOREIGN PATENT DOCUMENTS

CN      108920623 A      11/2018
CN      109086802 A      12/2018

(Continued)

OTHER PUBLICATIONS

WIPO publication 110287982, English translation (Year: 2019).*

(Continued)

*Primary Examiner* — Hien L Duong
(74) *Attorney, Agent, or Firm* — Buchanan Ingersoll & Rooney PC

(57) ABSTRACT

The disclosure relates to a method and a system for predicting the operation time of sparse matrix vector multiplication. The method comprises constructing a convolutional neural network comprising an input layer, a feature processing layer, a data splicing layer and an output layer for outputting (Continued)

prediction results. The method further comprises acquiring a plurality of groups of sparse matrices with known sparse matrix vector multiplication operation time as sample data, inputting the sample data into the convolutional neural network to train the convolutional neural network, and inputting the sparse matrix to be classified into the trained convolutional neural network to realize the prediction of the operation time of sparse matrix vector multiplication.

8 Claims, 3 Drawing Sheets

(56) References Cited

U.S. PATENT DOCUMENTS

| | | | | |
|---|---|---|---|---|
| 2011/0078226 | A1* | 3/2011 | Baskaran | G06F 17/16 |
| | | | | 708/607 |
| 2016/0378442 | A1* | 12/2016 | Rong | G06F 8/4434 |
| | | | | 717/140 |
| 2018/0189239 | A1* | 7/2018 | Nurvitadhi | G06F 9/3001 |
| 2018/0276527 | A1 | 9/2018 | Motoya et al. | |
| 2018/0357537 | A1* | 12/2018 | Munkberg | G06N 3/08 |
| 2019/0266217 | A1* | 8/2019 | Arakawa | G06F 7/462 |
| 2021/0150372 | A1* | 5/2021 | Jiang | G06F 18/24765 |
| 2021/0357476 | A1* | 11/2021 | Lee | G06N 3/04 |

FOREIGN PATENT DOCUMENTS

| | | |
|---|---|---|
| CN | 110287982 A | 9/2019 |
| CN | 111914213 A | 11/2020 |

OTHER PUBLICATIONS

Performance modeling of the sparse matrix-vector product via convolution neural networks. (Year: 2020).*

International Search Report (PCT/ISA/210) with translation and Written Opinion (PCT/ISA/237) mailed on Apr. 23, 2021, by the China National Intellectual Property Administration (ISA/CN) as the International Searching Authority for International Application No. PCT/CN2020/129085. (9 pages).

* cited by examiner

Construct a convolutional neural network, wherein the convolutional neural network comprises an input layer, a feature processing layer, a data splicing layer and an output layer; /S101

Acquire a plurality of groups of sparse matrices with known sparse matrix vector multiplication operation time as sample data, and input the sample data into the convolutional neural network to train the convolutional neural network; /S102

Input the sparse matrix to be classified into the trained convolutional neural network to realize the prediction of the operation time of sparse matrix vector multiplication. /S103

Fig. 1

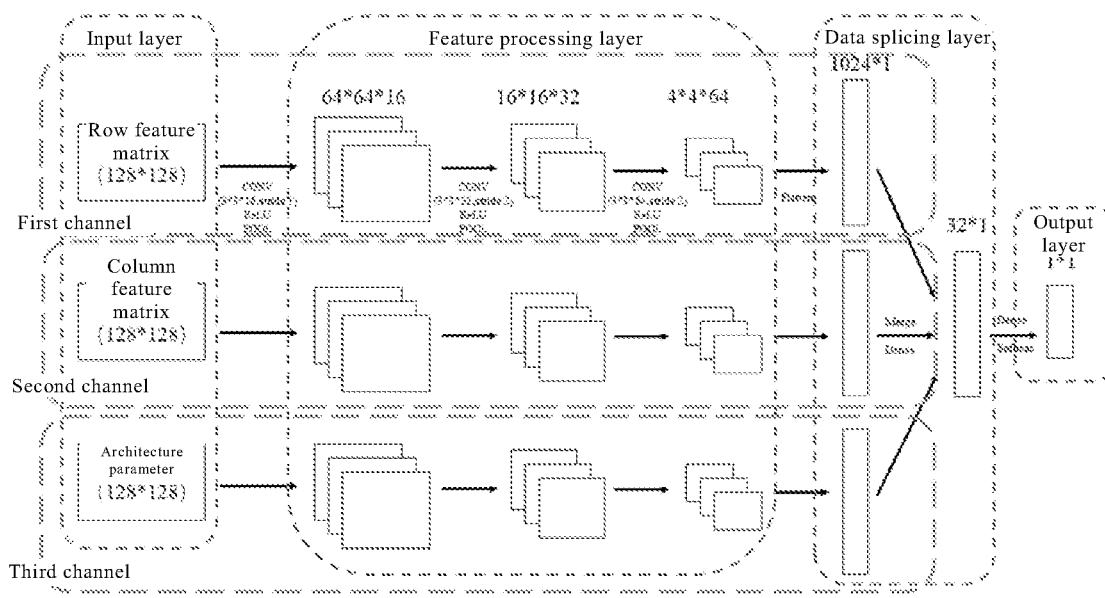

Fig. 2

METHOD AND SYSTEM FOR PREDICTING OPERATION TIME OF SPARSE MATRIX VECTOR MULTIPLICATION

TECHNICAL FIELD

The invention relates to the technical field of machine learning, in particular to a method for predicting the operation time of sparse matrix vector multiplication based on deep learning.

BACKGROUND ART

Sparse matrix vector multiplication is an important operation in the fields of scientific computation and engineering, and its intrinsic performance directly determines its performance in practical application. Due to the irregularity of an accessing memory in the process of sparse matrix vector multiplication, the performance of sparse matrix vector multiplication is low and needs to be optimized. At present, the optimization of sparse matrix vector multiplication generally focuses on the optimization of a specific storage format or platform, and there is no method for efficiently predicting the operation time of sparse matrix vector multiplication to provide guidance for performance optimization, so it is of great significance to predict the operation time of sparse matrix vector multiplication. For a given sparse matrix, the operation time of sparse matrix vector multiplication is expected to be returned without executing sparse matrix vector multiplication, so as to know the performance of corresponding sparse matrix vector multiplication.

Performance modeling means that a system can be regarded as a system representation for providing output values based on a given set of input parameters. Based on different modeling principles, performance modeling can be realized by a white box method or a black box method. Based on the analysis on computational characteristics, the white box method constructs a computational formula for the factors that affect algorithm performance to evaluate the algorithm performance. The advantage of the white box method is that it has strong interpretability. The black box method is based on a machine learning algorithm. According to the black box method, the relationship between input data and output data is established, the machine learning algorithm is obtained by training with a convolutional neural network or other methods, and then a prediction is made.

SUMMARY OF THE INVENTION

The purpose of the present invention is to provide a method for predicting the operation time of sparse matrix vector multiplication based on deep learning, so as to realize the prediction of the operation time of sparse matrix vector multiplication.

To achieve the above purpose, in one aspect, an embodiment of the present invention provides a method for predicting the operation time of sparse matrix vector multiplication based on deep learning, which comprises the following steps:

Constructing a convolutional neural network, wherein the convolutional neural network comprises an input layer, a feature processing layer, a data splicing layer and an output layer, the input layer is used for inputting the features of a row feature matrix, a column feature matrix and an architecture parameter expansion matrix in a sparse matrix, the feature processing layer is used for extracting the features in a previous layer, the data splicing layer is used for splicing the extracted features of the row feature matrix, the column feature matrix and the architecture parameter extension matrix, and the output layer is used for outputting prediction results;

Acquiring a plurality of groups of sparse matrices with known sparse matrix vector multiplication operation time as sample data, and inputting the sample data into the convolutional neural network to train the convolutional neural network; and Inputting the sparse matrix to be classified into the trained convolutional neural network to realize the prediction of the operation time of sparse matrix vector multiplication.

Preferably, the input layer comprises a first channel, a second channel and a third channel, wherein the first channel receives the row feature matrix generated by the sparse matrix, the second channel receives the column feature matrix generated by the sparse matrix, and the third channel receives the architecture parameter expansion matrix; and the feature processing layer comprises a first channel, a second channel and a third channel, wherein the first channel of the feature processing layer is used for extracting the features of the row feature matrix, the second channel of the feature processing layer is used for extracting the features of the column feature matrix, and the third channel of the feature processing layer is used for extracting the features of the architecture parameter extension matrix.

Preferably, the first channel, the second channel and the third channel of the feature processing layer have the same structure, which sequentially comprises a first convolutional layer, a first ReLU activation function layer, a first pooling layer, a second convolutional layer, a second ReLU activation function layer, a second pooling layer, a third convolutional layer, a third ReLU activation function layer and a third pooling layer.

Preferably, acquiring a plurality of groups of sparse matrices with known sparse matrix vector multiplication operation time as sample data, and inputting the sample data into the convolutional neural network to train the convolutional neural network comprise: extracting row feature matrices and column feature matrices with a preset size of 128×128 from the plurality of groups of sparse matrices, and applying a yaSpMV (yet Another Sparse matrix vector multiplication) open source tool to the sparse matrix to obtain a 14-dimensional architecture parameter vector and the sparse matrix vector multiplication operation time, wherein the architecture parameter vector is added with the number of non-zero elements of the sparse matrix to form a 15-dimensional architecture parameter vector, which is expanded into a 128×128 architecture parameter expansion matrix.

Preferably, inputting the sparse matrix to be classified into the trained convolutional neural network to realize the prediction of the operation time of sparse matrix vector multiplication comprises: extracting a row feature matrix and a column feature matrix with a preset size from the sparse matrix to be classified, and inputting the preprocessed sparse matrix and architecture parameter expansion matrix into the trained convolutional neural network.

Preferably, extracting a row feature matrix and a column feature matrix with a preset size from the sparse matrix to be classified specifically comprises: extracting a row feature and a column feature of the sparse matrix by using a histogram sampling method to obtain a row feature matrix and a column feature matrix of the sparse matrix, and normalizing the row and column feature matrices to obtain the row and column feature matrices which are used as inputs of the convolutional neural network.

In another aspect, an embodiment of the present invention provides a system for predicting the operation time of sparse matrix vector multiplication, which comprises:

A construction unit for constructing a convolutional neural network, wherein the convolutional neural network comprises an input layer, a feature processing layer, a data splicing layer and an output layer, the input layer is used for inputting the features of a row feature matrix, a column feature matrix and an architecture parameter expansion matrix in a sparse matrix, the feature processing layer is used for extracting the features in a previous layer, the data splicing layer is used for splicing the extracted features of the row feature matrix, the column feature matrix and the architecture parameter extension matrix, and the output layer is used for outputting prediction results;

An acquisition unit for acquiring a plurality of groups of sparse matrices with known sparse matrix vector multiplication operation time as sample data, and inputting the sample data into the convolutional neural network to train the convolutional neural network; and A prediction unit for inputting the sparse matrix to be classified into the trained convolutional neural network to realize the prediction of the operation time of sparse matrix vector multiplication.

According to the embodiments of the invention, the row feature matrix, the column feature matrix and the architecture parameter expansion matrix of the sparse matrix are convoluted separately, and the features are fused later to obtain the results, so that the purpose of reducing the complexity of the network can be achieved.

BRIEF DESCRIPTION OF THE DRAWINGS

FIG. 1 is a flow chart of a method for predicting the operation time of sparse matrix vector multiplication based on deep learning according to an embodiment of the present invention;

FIG. 2 is a structural diagram of a convolutional neural network;

DETAILED DESCRIPTION OF THE INVENTION

Figure 3:
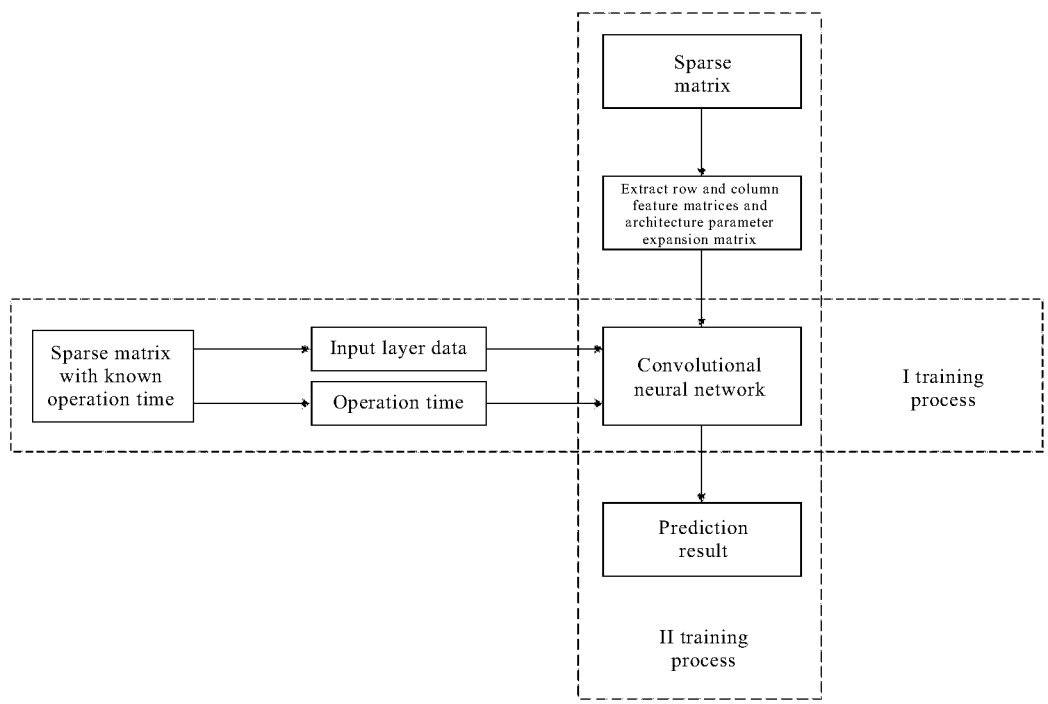
FIG. 3 is a diagram of a training process of a convolutional neural network.

The invention will be further described in detail with reference to the drawings and specific embodiments.

FIG. 1 is a flow chart of a method for predicting the operation time of sparse matrix vector multiplication based on deep learning according to an embodiment of the present invention. As shown in FIG. 1, the method comprises steps S101-S103.

S101, constructing a convolutional neural network.

The convolutional neural network comprises an input layer, a feature processing layer, a data splicing layer and an output layer.

The input layer is used for inputting a row feature matrix, a column feature matrix and an architecture parameter extension matrix in a sparse matrix. The input layer may comprise a first channel, a second channel and a third channel, wherein the first channel receives the row feature matrix generated by the sparse matrix, the second channel receives the column feature matrix generated by the sparse matrix, and the third channel receives the architecture parameter expansion matrix. Here, architecture parameters are the architecture parameters of a sparse matrix vector multiplication running platform, and the architecture parameter expansion matrix is a matrix formed by adding the number of non-zero elements to the architecture parameters.

The feature processing layer is used for extracting the features of the row feature matrix, the column feature matrix and the architecture parameter extension matrix in the sparse matrix in the input layer. The feature processing layer may comprise a first channel, a second channel and a third channel. The first channel of the feature processing layer is used for extracting the features of the row feature matrix, the second channel of the feature processing layer is used for extracting the features of the column feature matrix, and the third channel of the feature processing layer is used for extracting the features of the architecture parameter extension matrix. In an example, the first channel of the feature processing layer, the second channel of the feature processing layer and the third channel of the feature processing layer have the same structure, which sequentially comprises a first convolutional layer, a first ReLU activation function layer, a first pooling layer, a second convolutional layer, a second ReLU activation function layer, a second pooling layer, a third convolutional layer, a third ReLU activation function layer and a third pooling layer, wherein the convolutional layers are used for feature extraction of input data, the activation function layers are used for assisting in expressing complex features, and the pooling layers are used for feature selection and information filtration.

The data splicing layer comprises a Flatten layer and a full connection layer, and is used for splicing the extracted features of the row feature matrix, the column feature matrix and the architecture parameter extension matrix.

The output layer comprises a Softmax layer which is used for outputting prediction results.

Step 2, acquiring a plurality of groups of sparse matrices with known sparse matrix vector multiplication operation time as sample data, and inputting the sample data into the convolutional neural network to train the convolutional neural network.

Specifically, a plurality of groups of sparse matrices with known sparse matrix vector multiplication operation time are acquired as training sample data, and the training sample data are preprocessed and subjected to matrix feature extraction to obtain a training data set.

A row feature and a column feature of the sparse matrix are extracted from the sparse matrix in the training data set by using a histogram sampling algorithm to obtain a row feature matrix and a column feature matrix of the sparse matrix, and the row and column feature matrices are normalized. A 14-dimensional architecture parameter vector and corresponding sparse matrix vector multiplication operation time are obtained by using open source software yaSpMV, wherein the 14-dimensional architecture parameter vector includes sparse matrix storage format, column compression, thread block width, thread block height, data type of bit denotation array, vertical slice number, transpose, texture memory, thread block size, register size, shared memory size, thread-level slice processor size, result cache size and execution time in the yaSpMV tool. A dimension, i.e., the number of non-zero elements of the sparse matrix, is added to the architecture parameter vector to form a 15-dimensional architecture parameter vector, which is expanded to a scale of 128×128 to form the architecture parameter expansion matrix.

By taking the extraction of the row feature matrix as an example, the following chart illustrates the process of the histogram sampling algorithm in a pseudo-code form. The extraction of the column feature matrix only requires transposition of the corresponding sparse matrix (represented by A in the chart), followed by the application of the histogram sampling algorithm.

Histogram Sampling Algorithm
  Normalized through Histogram Sampling.
  1: procedure HISTNORM (A, r, BINS)
  2: /* create a row histogram for an input matrix A */
  3: /* the target representation is a r×BINS matrix R*/
  4: /* If applied to a column matrix, transpose the matrix A first*/
  5: initialize a r×BINS empty matrix R//initialize a r×BINS matrix R
  6: Scale Ratio=A.height/r//calculate scale ratio
  7: Max Dim=max (A.height, A.width)//calculate the maximum dimension of matrix A
  8: for each non-zero entry e in A do//for each non-zero entry e in A do
  9: int row=e.row/Scale Ratio//calculate the corresponding row number in matrix R
  10: bin=BINS×|e.row−e.col|/Max Dim//calculate the corresponding column number in matrix R
  11: R[row][bin]++//the number of corresponding positions in the matrix R plus one
  12: return R//obtain matrix R, that is, feature matrix after histogram sampling The row feature matrix of the sparse matrix, the column feature matrix of the sparse matrix and the architecture parameter expansion matrix are input to the convolutional neural network to train the convolutional neural network.

Step 3, inputting into the trained convolutional neural network the sparse matrix to be classified to realize the prediction of the operation time of sparse matrix vector multiplication.

Specifically, the sparse matrix to be classified is taken as test sample data, and the test sample data are preprocessed and subjected to matrix feature extraction to obtain a test data set.

A row feature and a column feature of the sparse matrix are extracted from the sparse matrix in the test data set by using a histogram sampling algorithm to obtain a row feature matrix and a column feature matrix of the sparse matrix, and the row and column feature matrices are normalized. A 14-dimensional architecture parameter vector and corresponding sparse matrix vector multiplication operation time are obtained by using open source software yaSpMV, wherein a dimension, i.e., the number of non-zero elements of the sparse matrix, is added to the architecture parameter vector to form a 15-dimensional architecture parameter vector, which is expanded to a scale of 128×128 to form the architecture parameter expansion matrix.

The row feature matrix of the sparse matrix, the column feature matrix of the sparse matrix and the architecture parameter expansion matrix are input to the trained convolutional neural network to realize the prediction of the operation time of sparse matrix vector multiplication.

FIG. 2 is a structural diagram of a convolutional neural network. As shown in FIG. 2, the first channel of the input layer receives a 128*128 row feature matrix generated by the sparse matrix.

The first channel of the feature processing layer extracts the 128*128 row feature matrix, and the first channel of the feature processing layer processes the 128*128 row feature matrix through the first convolutional layer, the first ReLU activation function layer and the first pooling layer, that is, the 128*128 row feature matrix is convolved by a 3*3*16 convolution kernel with a step size of 1, and then processed by a ReLU function and a pooling layer, so as to obtain a 64*64*16 feature map through a 2*2 filter.

The first channel of the feature processing layer processes a 64*64*16 intermediate result through the second convolutional layer, the second ReLU activation function layer and the second pooling layer, that is, a 64*64*16 row feature matrix is subjected to feature extraction by a 3*3*32 convolution kernel with a step size of 2, so as to obtain a 16*16*32 feature map.

The first channel of the feature processing layer processes a 16*16*32 intermediate result through the third convolutional layer, the third ReLU activation function layer and the third pooling layer, that is, a 16*16*32 row feature matrix is subjected to feature extraction by a 3*3*64 convolution kernel with a step size of 2, so as to obtain a 4*4*64 feature map.

A 4*4*64 feature map can also be obtained after a 128*128 column feature matrix extracted by the second channel of the feature processing layer is processed by the feature processing layer.

A 4*4*64 feature map can also be obtained after a 128*128 architecture parameter feature matrix extracted by the third channel of the feature processing layer is processed by the feature processing layer.

The data splicing layer obtains 1024*1-dimensional row feature vectors, 1024*1-dimensional column feature vectors and 1024*1-dimensional architecture parameter vectors through the Flatten layer, and then obtains 32*1-dimensional vectors by splicing the 1024*1-dimensional row feature vectors, 1024*1-dimensional column feature vectors and 1024*1-dimensional architecture parameter vectors through the full connection layer.

The output layer realizes the prediction of the operation time of sparse matrix vector multiplication by the activation function Softmax.

In a specific embodiment:

Assume a 841*841 sparse matrix with the number of non-zero elements 3988 is given, a 128*128 row feature matrix and a 128*128 column feature matrix are extracted by using a histogram sampling method, and the number of non-zero elements of the row feature matrix and the number of non-zero elements of the column feature matrix are obtained at the same time and are both 256. The extracted row feature matrix and column feature matrix are used as inputs of the first channel and the second channel of the convolutional neural network respectively. A 841*841 sparse matrix is applied to a yaSpMV open source tool, and multiple groups of 14*1 architecture parameter vectors and the corresponding operation time (in milliseconds) for executing sparse matrix vector multiplication under each group of architecture parameters are obtained. A dimension, that is, the number of non-zero elements of the sparse matrix (i.e. 3988) is added to the 14*1 architecture parameter vector to form a 15*1 architecture parameter vector, which is filled with 0 elements to be expanded to a 128*128 architecture parameter expansion matrix as the input of the third channel of the convolutional neural network. The corresponding operation time of each group is taken as a y tag (true value).

Taking the first channel as an example, a 128*128 row feature vector matrix is convolved by a 3*3*16 convolution kernel with a step size of 1 to obtain a 126*126*16 convolution result, and then a 64*64*16 intermediate result is obtained by excitation and pooling with a filter whose step size is 2*2.

A 32*32*32 convolution result is obtained by convolution with a 3*3*32 convolution kernel whose step size is 2, and then a 16*16*32 intermediate result is obtained by excitation and pooling with a filter whose step size is 2*2.

A 8*8*64 convolution result is obtained by convolution with a 3*3*64 convolution kernel whose step size is 2, and then a 4*4*64 intermediate result is obtained by excitation and pooling with a filter whose step size is 2*2.

A 1024*1 result is obtained through the Flatten layer, and then combined with the results of the other two channels to obtain a 32*1 result. Finally, 1*1 prediction time is obtained through the Softmax layer, for example, 0.009500, in milliseconds.

According to the embodiment of the invention, the row feature matrix, the column feature matrix and the architecture parameter expansion matrix of the sparse matrix are convoluted separately, and the features are fused later to obtain the results, so that the purpose of reducing the complexity of the network can be achieved.

FIG. 3 is a diagram of a training process of a convolutional neural network. As shown in FIG. 3, in the horizontal training process, input layer data of a training sample and corresponding sparse matrix vector multiplication operation time are obtained by using the open source software yaSpMV, and the input layer data and the corresponding sparse matrix vector multiplication operation time are input to the convolutional neural network to train the convolutional neural network. In the longitudinal training process, the sparse matrix to be classified is input to the trained convolutional neural network to realize the prediction of the operation time of sparse matrix vector multiplication.

Figure 4:
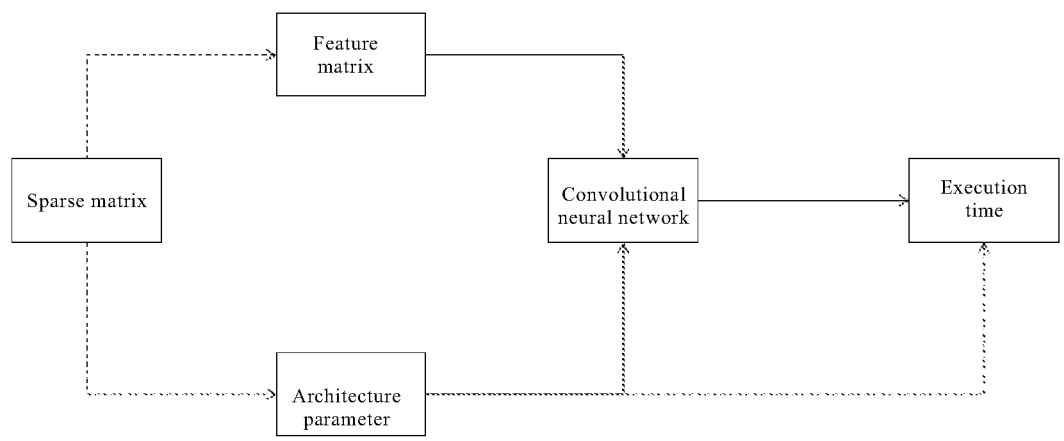
FIG. 4 is a workflow diagram for constructing a convolutional neural network model.

FIG. 4 is a workflow diagram for constructing a convolutional neural network model. As shown in FIG. 4, the dashed line in the figure indicates the process of data preprocessing, through which the row and column feature matrices of the sparse matrix are obtained. By applying the yaSpMV tool to the sparse matrix, an architecture parameter with the shortest execution time Sparse matrix vector multiplication (SpMV) is obtained, and the architecture parameter is taken as input and execution time as a y tag (true value). The solid line represents the working process of the model. The feature matrices and the architecture parameter are input into the convolutional neural network to be processed by the convolutional neural network to obtain the predicted execution time (predicted value).

Figure 5:
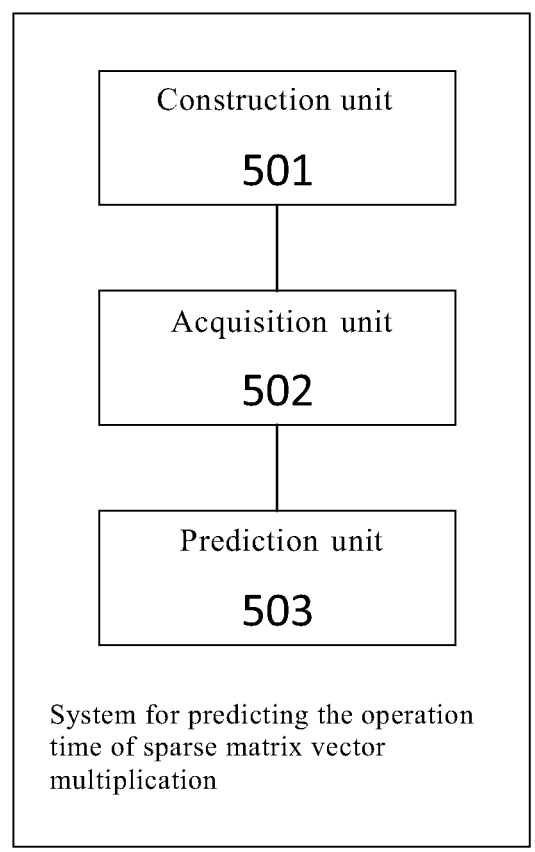
FIG. 5 is a structural diagram of a system for predicting the operation time of sparse matrix vector multiplication based on deep learning according to an embodiment of the present invention.

Accordingly, an embodiment of the present invention provides a structural diagram of a system for predicting the operation time of sparse matrix vector multiplication based on deep learning. As shown in FIG. 5, the system for predicting the operation time of sparse matrix vector multiplication comprises:

A construction unit for constructing a convolutional neural network, wherein the convolutional neural network comprises an input layer, a feature processing layer, a data splicing layer and an output layer, the input layer is used for inputting the features of a row feature matrix, a column feature matrix and an architecture parameter expansion matrix in a sparse matrix, the feature processing layer is used for extracting the features in a previous layer, the data splicing layer is used for splicing the extracted features of the row feature matrix, the column feature matrix and the architecture parameter extension matrix, and the output layer is used for outputting prediction results;

An acquisition unit for acquiring a plurality of groups of sparse matrices with known sparse matrix vector multiplication operation time as sample data, and inputting the sample data into the convolutional neural network to train the convolutional neural network; and A prediction unit for inputting the sparse matrix to be classified into the trained convolutional neural network to realize the prediction of the operation time of sparse matrix vector multiplication.

Many variations of the disclosure herein can be made without departing from the scope of the disclosure. Those skilled in the art may contemplate modifications to the disclosed embodiments that are also covered by the claims or equivalents thereof. The protection scope of the present invention is limited only by the claims.

The invention claimed is:

1. A method for predicting the operation time of sparse matrix vector multiplication, wherein comprising the following steps:
constructing a convolutional neural network, wherein the convolutional neural network comprises an input layer, a feature processing layer, a data splicing layer and an output layer, the input layer is used for inputting features of a row feature matrix, a column feature matrix and an architecture parameter expansion matrix in a sparse matrix, the feature processing layer is used for extracting features in a previous layer, the data splicing layer is used for splicing the extracted features of the row feature matrix, the column feature matrix and the architecture parameter extension matrix, and the output layer is used for outputting prediction results;
acquiring a plurality of groups of sparse matrices with known sparse matrix vector multiplication operation time as sample data, and inputting the sample data into the convolutional neural network to train the convolutional neural network, wherein acquiring a plurality of groups of sparse matrices with known sparse matrix vector multiplication operation time as sample data, and inputting the sample data into the convolutional neural network to train the convolutional neural network comprise:
extracting row feature matrices and column feature matrices with a preset size of 128×128 from the plurality of groups of sparse matrices, and applying a yet Another Sparse matrix vector multiplication (yaSpMV) open source tool to the sparse matrix to obtain a 14-dimensional architecture parameter vector and the sparse matrix vector multiplication operation time, wherein the architecture parameter vector is added with the number of non-zero elements of the sparse matrix to form a 15-dimensional architecture parameter vector, which is expanded into a 128×128 architecture parameter expansion matrix;
inputting the sparse matrix to be classified into the trained convolutional neural network to realize the prediction of the operation time of sparse matrix vector multiplication; and
optimizing performance of an application based on the realized prediction of the operation time of the sparce matrix vector multiplication.

2. The method according to claim 1, wherein:
the input layer comprises a first channel, a second channel and a third channel, wherein the first channel receives the row feature matrix generated by the sparse matrix, the second channel receives the column feature matrix generated by the sparse matrix, and the third channel receives the architecture parameter expansion matrix; and the feature processing layer comprises a first channel, a second channel and a third channel, wherein the first channel of the feature processing layer is used for extracting the features of the row feature matrix, the second channel of the feature processing layer is used for extracting the features of the column feature matrix, and the third channel of the feature processing layer is used for extracting the features of the architecture parameter extension matrix.

3. The method according to claim 1, wherein the first channel, the second channel and the third channel of the feature processing layer have a same structure, which sequentially comprises a first convolutional layer, a first rectified linear unit (ReLU) activation function layer, a first pooling layer, a second convolutional layer, a second ReLU activation function layer, a second pooling layer, a third convolutional layer, a third ReLU activation function layer and a third pooling layer.

4. The method according to claim 1, wherein inputting the sparse matrix to be classified into the trained convolutional neural network to realize the prediction of the operation time of sparse matrix vector multiplication comprises:

extracting a row feature matrix and a column feature matrix with a preset size from the sparse matrix to be classified, and inputting the preprocessed sparse matrix and the architecture parameter expansion matrix into the trained convolutional neural network.

5. The method according to claim 1, wherein extracting a row feature matrix and a column feature matrix with a preset size from the sparse matrix to be classified specifically comprises:

extracting a row feature and a column feature of the sparse matrix by using a histogram sampling method to obtain a row feature matrix and a column feature matrix of the sparse matrix; and normalizing the row and column feature matrices to obtain the row and column feature matrices which are used as inputs of the convolutional neural network.

6. A modeling system for predicting the operation time of sparse matrix vector multiplication, wherein comprising:

a construction unit for constructing a convolutional neural network, wherein the convolutional neural network comprises an input layer, a feature processing layer, a data splicing layer and an output layer, the input layer is used for inputting features of a row feature matrix, a column feature matrix and an architecture parameter expansion matrix in a sparse matrix, the feature processing layer is used for extracting features in a previous layer, the data splicing layer is used for splicing the extracted features of the row feature matrix, the column feature matrix and the architecture parameter extension matrix, and the output layer is used for outputting prediction results;

an acquisition unit for acquiring a plurality of groups of sparse matrices with known sparse matrix vector multiplication operation time as sample data, and inputting the sample data into the convolutional neural network to train the convolutional neural network, wherein acquiring a plurality of groups of sparse matrices with known sparse matrix vector multiplication operation time as sample data, and inputting the sample data into the convolutional neural network to train the convolutional neural network comprise:

extracting row feature matrices and column feature matrices with a preset size of 128×128 from the plurality of groups of sparse matrices, and applying a yet Another Sparse matrix vector multiplication (yaSpMV) open source tool to the sparse matrix to obtain a 14-dimensional architecture parameter vector and the sparse matrix vector multiplication operation time, wherein the architecture parameter vector is added with the number of non-zero elements of the sparse matrix to form a 15-dimensional architecture parameter vector, which is expanded into a 128×128 architecture parameter expansion matrix; and a prediction unit for inputting the sparse matrix to be classified into the trained convolutional neural network to realize the prediction of the operation time of sparse matrix vector multiplication and optimizing performance of an application based on the realized prediction of the operation time of the sparce matrix vector multiplication.

7. The system according to claim 6, wherein the input layer comprises a first channel, a second channel and a third channel, wherein the first channel receives the row feature matrix generated by the sparse matrix, the second channel receives the column feature matrix generated by the sparse matrix, and the third channel receives the architecture parameter expansion matrix; and the feature processing layer comprises a first channel, a second channel and a third channel, wherein the first channel of the feature processing layer is used for extracting the features of the row feature matrix, the second channel of the feature processing layer is used for extracting the features of the column feature matrix, and the third channel of the feature processing layer is used for extracting the features of the architecture parameter extension matrix.

8. The system according to claim 6, wherein extracting a row feature matrix and a column feature matrix with a preset size from the sparse matrix to be classified specifically comprises:

extracting a row feature and a column feature of the sparse matrix by using a histogram sampling method to obtain a row feature matrix and a column feature matrix of the sparse matrix; and normalizing the row and column feature matrices to obtain the row and column feature matrices which are used as inputs of the convolutional neural network.

* * * * *